(12) United States Patent
Kirstine

(10) Patent No.: US 7,131,211 B2
(45) Date of Patent: Nov. 7, 2006

(54) METHOD AND APPARATUS FOR MEASUREMENT OF THICKNESS AND WARPAGE OF SUBSTRATES

(75) Inventor: Rodney L. Kirstine, Caldwell, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/642,921

(22) Filed: Aug. 18, 2003

(65) Prior Publication Data

US 2005/0039342 A1  Feb. 24, 2005

(51) Int. Cl.
*G01B 3/00* (2006.01)

(52) U.S. Cl. .................. 33/552; 33/501.02; 33/555

(58) Field of Classification Search .......... 33/548–555, 33/503–504, 556–558, 558.01, 558.4, 559–560, 33/530, 533, 783–784, 501.02, 501.03
See application file for complete search history.

(56) References Cited

U.S. PATENT DOCUMENTS

| | | | | | |
|---|---|---|---|---|---|
| 3,528,002 | A | * | 9/1970 | Dunlavey | 33/501.03 |
| 4,271,699 | A | * | 6/1981 | Williamson | 33/501.02 |
| 4,400,884 | A | * | 8/1983 | Baresh et al. | 33/552 |
| 4,687,979 | A | * | 8/1987 | Ashton et al. | 33/557 |
| 4,750,141 | A | * | 6/1988 | Judell et al. | 33/551 |
| 4,791,367 | A | | 12/1988 | Typpo | |
| 4,914,828 | A | * | 4/1990 | Fiedor et al. | 33/554 |
| 5,075,979 | A | * | 12/1991 | Foskett | 33/501.02 |
| 5,132,619 | A | | 7/1992 | Typpo | |
| 5,237,754 | A | * | 8/1993 | Oexler | 33/501.02 |
| 5,735,055 | A | * | 4/1998 | Hochbein et al. | 33/554 |
| 5,806,199 | A | * | 9/1998 | King | 33/552 |
| 5,883,313 | A | * | 3/1999 | Ercole et al. | 33/552 |
| 5,884,410 | A | * | 3/1999 | Prinz | 33/559 |
| 6,108,924 | A | * | 8/2000 | Jang et al. | 33/552 |
| 6,141,883 | A | * | 11/2000 | Mitchell et al. | 33/501.02 |
| 6,145,211 | A | | 11/2000 | Typpo et al. | |
| 6,242,926 | B1 | * | 6/2001 | Gardopee et al. | 324/661 |
| 6,289,599 | B1 | * | 9/2001 | Leifeld et al. | 33/501.02 |
| 6,367,159 | B1 | * | 4/2002 | Naoi et al. | 33/552 |
| 6,427,353 | B1 | * | 8/2002 | Nelson et al. | 33/552 |
| 6,522,777 | B1 | | 2/2003 | Paulsen et al. | |
| 6,648,708 | B1 | * | 11/2003 | Monks | 33/552 |
| 6,678,634 | B1 | * | 1/2004 | Wendt et al. | 702/170 |
| 6,701,633 | B1 | * | 3/2004 | Ohtsuka | 33/552 |
| 6,754,973 | B1 | * | 6/2004 | Takahashi | 33/551 |
| 6,865,818 | B1 | * | 3/2005 | Petrowich | 33/501.02 |

* cited by examiner

*Primary Examiner*—Yaritza Guadalupe
(74) *Attorney, Agent, or Firm*—TraskBritt

(57) ABSTRACT

An apparatus comprises one or more pairs of mutually coaxial and opposing linear measuring devices including movable, biased fingers for simultaneously determining the thickness and warpage of a substrate such as a circuit board passing between the fingers. Each measuring device is calibrated to a zero point by bringing the ends of the movable fingers together and recording the distance or position thereof. Data for computation of substrate thickness and warpage measurements is obtained by recording displacement distances or positions of the movable fingers in contact with opposing surfaces of the substrate with respect to the zero point, the thickness and warpage then being calculated. The apparatus may be integrated with an assembly line, including incorporation with an existing piece of equipment, so that substrates exhibiting out-of-specification thickness or excessive warpage may be reworked, discarded or downgraded during the manufacturing process.

44 Claims, 6 Drawing Sheets

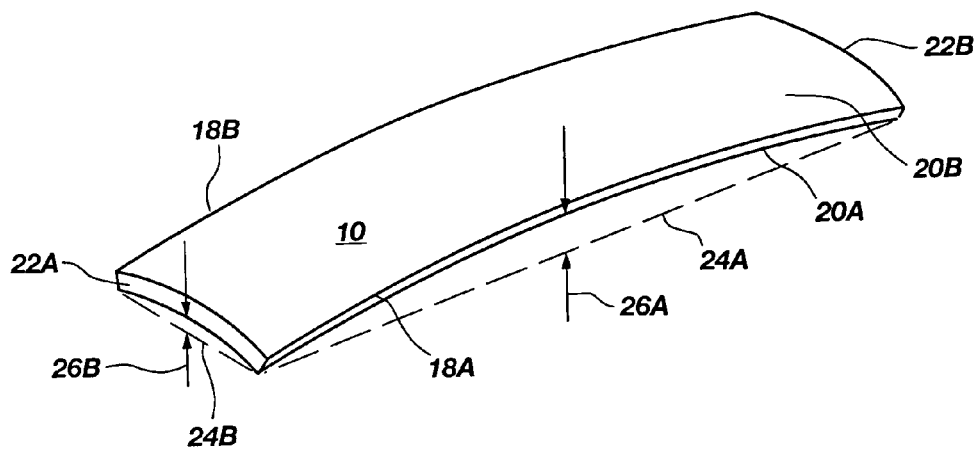
FIG. 4
*(PRIOR ART)*
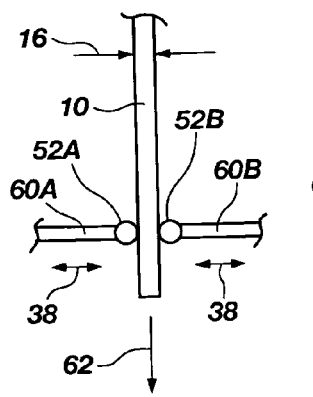 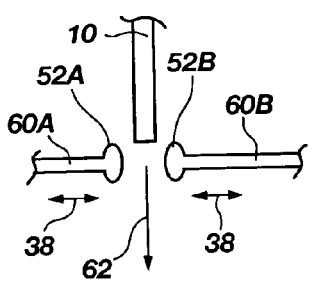 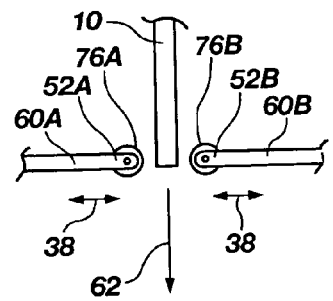
FIG. 6     FIG. 7     FIG. 8
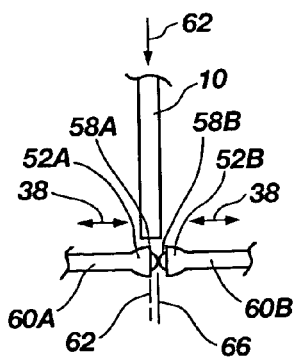
FIG. 9

METHOD AND APPARATUS FOR MEASUREMENT OF THICKNESS AND WARPAGE OF SUBSTRATES

BACKGROUND OF THE INVENTION

1. Field of the Invention

The present invention relates generally to the manufacture of semiconductor device assemblies. More specifically, the invention pertains to a method and apparatus for measuring the thickness and warpage, or nonplanarity, of substrates for carrying semiconductor devices and the like.

2. State of the Art

In the electronics industry, as well as in many other fields, the suitability of a particular planar member for use may be dependent upon its planarity, i.e., the degree to which a major surface or surfaces are planar. For example, many electronic components are formed as assemblies using semiconductor devices mounted on thin substrates, e.g., circuit boards such as conventional FR-4, FR-5 and BT resin circuit boards. Exemplary semiconductor devices include dynamic random access memory (DRAM) devices, static random access memory (SRAM) devices, flash memory devices, imagers, and many other devices. An exemplary semiconductor device assembly may comprise a memory module comprising a plurality of DRAM semiconductor devices mounted to a substrate in the form of a circuit board.

The thickness of many circuit boards used for such assemblies is generally from about 0.02 inch to about 0.125 inch. The steps in circuit board fabrication generally leave inherent stresses in one or more directions within a circuit board panel from which individual circuit boards are cut. Cutting of a large board panel into smaller discrete circuit boards relieves some of the inherent stress, resulting in some degree of warpage of each circuit board. The attachment of semiconductor devices to a circuit board may also introduce stresses, such as when flip-chip configured semiconductor dice are mechanically and electrically connected to terminals on the circuit board using solder reflow. Although a limited amount of warping may be generally acceptable, as may warpage in particular directions, excessive warpage or warpage in other directions (individually and collectively "unacceptable warpage") causes several problems. Unacceptable warpage may make installation of a completed assembly into test fixtures or higher-level packaging, such as a motherboard, difficult because of board curvature and nonalignment of electrical connectors. Also, unacceptable warpage affects the assembly packaging process in terms of difficulty in satisfactorily positioning the assembly into an encapsulant mold assembly, and nonuniformity of distribution of encapsulant material on the assembly surfaces and about the base of the semiconductor devices and their connections to circuit board terminals. As a result, completed but defective semiconductor device assemblies may need to be reworked (where possible), discarded or downgraded into products of lower value, reducing overall productivity.

Warpage may occur in any direction. For example, significant warpage may occur simply along an X-axis and/or Y-axis of a substrate. Additionally, warpage may occur in directions noncongruent with the conventional X, Y, and Z axes. Warpage in multiple planes or in directions oblique to planes may be termed "complex" warpage.

Current inspection methods for determining whether a substrate is excessively warped (or otherwise misshaped) generally utilize visual systems. Such systems are characterized by the use of either human vision or machine vision, the latter generally providing a faster and more reliable quantitative measurement of warpage. An example of such a machine vision-based apparatus is shown in U.S. Pat. No. 6,522,777 of Paulsen et al. Such systems are complex, fairly slow, very expensive, and have a degree of accuracy which is generally beyond that required in determining warpage. Use of such machines in determining thickness and warpage of semiconductor device assemblies such as memory modules adds significantly to the cost of production.

There exist various types of equipment for measuring thickness. The common manual caliper may be useful for product development but is too time-consuming for production operations. The web measuring gauges common in the paper industry are useful for determining thickness of sheet materials moving at high speed. Such machines are shown in U.S. Pat. Nos. 4,791,367; 5,132,619 of Typpo, and U.S. Pat. No. 6,145,211 of Typpo et al. None of these machines is designed for, or capable of, measuring warpage in a substantially rigid substrate.

It would thus be desirable to provide an apparatus and method for determining unidirectional or multidirectional warpage in a substrate such as a circuit board.

It would also be desirable to provide an apparatus and method for simultaneous measurement of the warpage and thickness of a substrate.

It would be further desirable to provide an automated apparatus and method for determining the warpage of each of a stream of substrates passing through an assembly line or other continuous manufacturing environment and which, if desired, may be incorporated into existing equipment.

In addition, it would be desirable to provide an apparatus and method for determining linear and/or complex warpage of a stream of substrates in a single measurement pass for each substrate.

BRIEF SUMMARY OF THE INVENTION

The present invention comprises, in exemplary embodiments, an apparatus and method for determining at least one dimensional value of a substantially planar substrate. More specifically, the present invention enables determination of a degree of warpage in a substrate with opposed surfaces which are normally (or desirably) planar, or flat. The apparatus and method are useful for determining both substrate thickness at various locations on a substrate and nonplanarity (warpage) of any substrate with desirably flat surfaces.

In the present invention, at least one caliper gauge including two linear measurement devices having opposed, movable fingers is mounted in coaxial fashion, finger to finger. A contact member on each finger is configured and positioned to contact one of the two opposing surfaces of an intervening substrate disposed transverse to the fingers. One or more position readings for each finger is recorded while in contact with, and displaced by, the substrate. A zero reading for calibration of each finger is subtracted from the respective measured value. The two resulting displacement differences are added to determine the substrate thickness. By obtaining a plurality of measurements along the X, Y, or Z axis, linearity may be determined along the axis. Nonlinearity, i.e. warpage, may be characterized along the three axes or in directions oblique to any axis.

The apparatus for measuring substrate thickness and warpage may employ conventional commercial linear measuring devices such as those with fingers having terminal contact members which slide or roll on the substrate surfaces. A substrate carrier for disposing and moving a substrate between the linear measurement devices may comprise a robotic gripper of an assembly line for semicontinuous or continuous measurement and determination of warpage in combination with substrate thickness.

The apparatus is simple yet robust, uses conventional linear measuring devices, is easily calibrated to zero in a manner such that the accuracy thereof remains unaffected by wear of the contact members, and is easily incorporated into an automated assembly line or other continuous manufacturing environment.

BRIEF DESCRIPTION OF THE SEVERAL VIEWS OF THE DRAWINGS

The nature of the present invention as well as other embodiments thereof may be more clearly understood by reference to the following detailed description of the invention, to the appended claims, and to the several drawings herein, wherein:

FIG. 4 is a perspective view of an exemplary prior art substrate showing one-dimensional warpage;

FIG. 6 is a top view of a set of biased caliper fingers including a first embodiment of terminal contact members of the invention;

FIG. 7 is a top view of a set of biased caliper fingers including a second embodiment of terminal contact members of the invention;

FIG. 8 is a top view of a set of biased caliper fingers including a third embodiment of terminal contact members of the invention;

FIG. 9 is a top view of a set of biased caliper fingers including a fourth embodiment of terminal contact members of the invention;

DETAILED DESCRIPTION OF THE INVENTION

Figure 1:
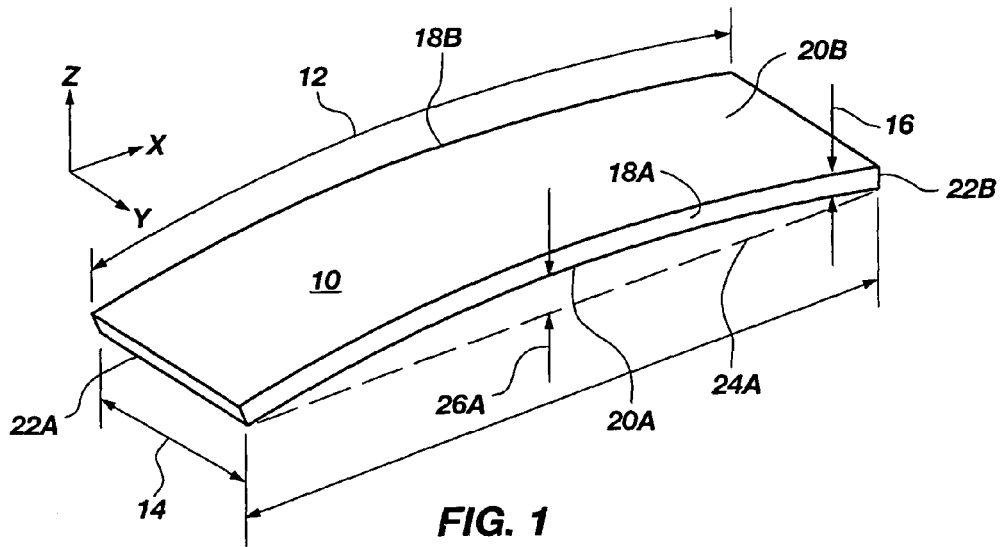
FIG. 1 is a perspective view of an exemplary prior art substrate showing one-dimensional warpage in a first direction.

In use and operation, and referring to FIGS. 1, 2, 3 and 4, an exemplary pseudo-planar substrate 10 such as a memory module is depicted. The term "pseudo-planar" is used to denote a substrate which is substantially planar and, to the naked eye, may appear to be planar, but which in actuality may exhibit nonplanarity in the form of warpage. The substrate 10 is depicted as having two major surfaces which are generally rectangular in shape and may be subject to variations in thickness and/or warpage. The degree of warpage shown in the figures is generally exaggerated for illustrative purposes. The substrate 10 is shown with first and second major surfaces 20A and 20B, respectively, which have a nominal length 12, a nominal width 14 and nominal thickness 16 therebetween. The lateral edges of substrate 10 are designated as edges 18A, 18B and the end edges as 22A, 22B. Substrate 10 is pictured as having been cut from a larger panel of substrate material (not shown) having internal stress(es) introduced during panel fabrication. The substrate 10 may have other structures mounted thereon, such as semiconductor devices and/or other components, not shown. As a result of the internal stress(es), warping in different directions may occur due to stress relief upon cutting of discrete substrates from the panel. As shown in FIG. 1, longitudinal warping along the X-axis results in warpage displacement 26A in the Z-direction transverse to the major plane of substrate 10, and is defined as displacement of substrate major surface 20A from a straight line 24A connecting the end edges 22A and 22B of the substrate 10. Line 24A represents the theoretical location of major surface 20A if the substrate 10 was truly planar. The term "warpage" may represent various dimensional attributes of substrate 10; for the purposes of this application, "warpage" represents the actual displacement from a straight line 24A representing a plane through the ends of a major surface, i.e., a condition of no warping, and will be generally indicated at a point of maximum displacement.

Figure 2:
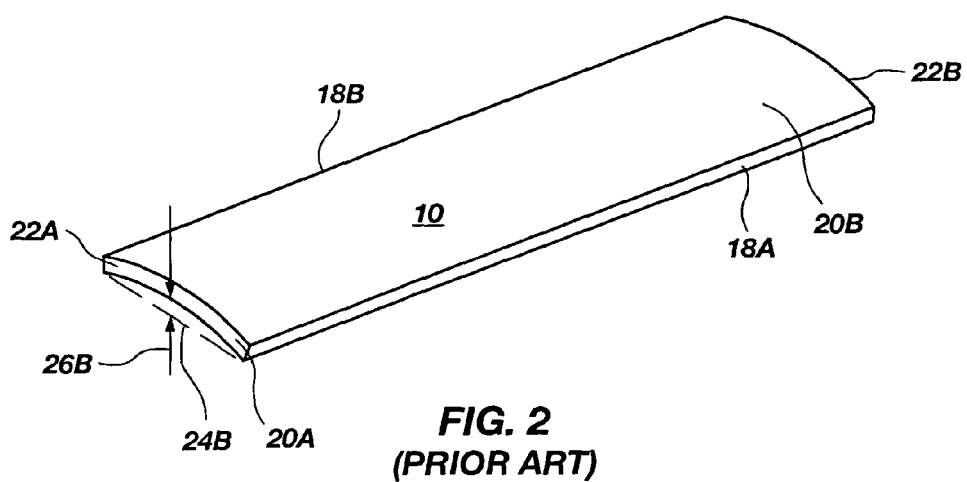
FIG. 2 is a perspective view of an exemplary prior art substrate showing one-dimensional warpage in a second direction.
Figure 3:
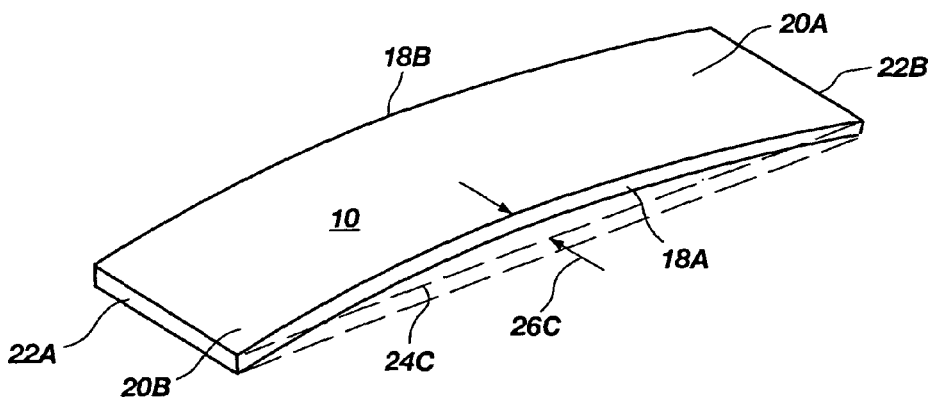
FIG. 3 is a perspective view of an exemplary prior art substrate showing one-dimensional warpage in a third direction.

As shown in FIG. 2, the warpage may also be in the Y-direction, causing displacement 26B in a Z-direction between the surface 20A and a line 24B extending between the lateral edge 18A and lateral edge 18B across the width 14. As illustrated in FIG. 3, the warpage may occur in a second longitudinal (X) direction and produce warpage displacement 26C between edge 18A and a line 24C extending between end edges 22A and 22B in a lateral (Y) direction. In FIGS. 1, 2, and 3, the warpage displacement is shown as being unidirectional. FIG. 4 illustrates the case where warping of a substrate 10 may occur in several directions X and Y, leading to two measurable warpage displacements 26A and 26B in the same or in different directions. It is noted that in FIG. 3, like the lateral warpage displacement 26C in the Y direction, lateral warpage displacement may also alternatively (or additionally) occur in the X direction.

FIG. 4 illustrates the case where warping of a substrate 10 may occur in several directions X and Y, leading to two measurable warpage displacements 26A and 26B in the same or differing directions. Further, where the cut lines from a larger panel are not coincident with stress lines in the substrate 10, a complex warpage pattern may be produced which resembles rotative twisting of the substrate instead of, or in addition to, bowing in one or more directions. Excessive warpage of a substrate, whether unidirectional, multidirectional, or of a complex pattern, complicates or prevents an effective encapsulant molding packaging step and results in module terminals which may not be in proper alignment with the connectors of the higher level assembly to which it is to be attached.

In the present invention, an apparatus and method have been developed which measures the warpage of a pseudo-planar substrate, enabling determination of an unacceptable substrate before further manufacturing/packaging/testing operations are conducted and increasing yield and overall productivity while decreasing manufacturing cost by eliminating processing of defective substrates. The apparatus is configured to take measurements from which both the substrate thickness and warpage may be determined of the method of the present invention. The apparatus may be combined with or incorporated in, for example and not by way of limitation, an apparatus for severing substrates such as circuit boards from a larger panel so that warpage of each substrate may be determined before the addition of semiconductor devices thereto. Alternatively, or in addition, an apparatus according to the present invention may be placed in the manufacturing sequence immediately after semiconductor devices as well as other electronic components have been placed on and secured to the substrate.

Figure 5:
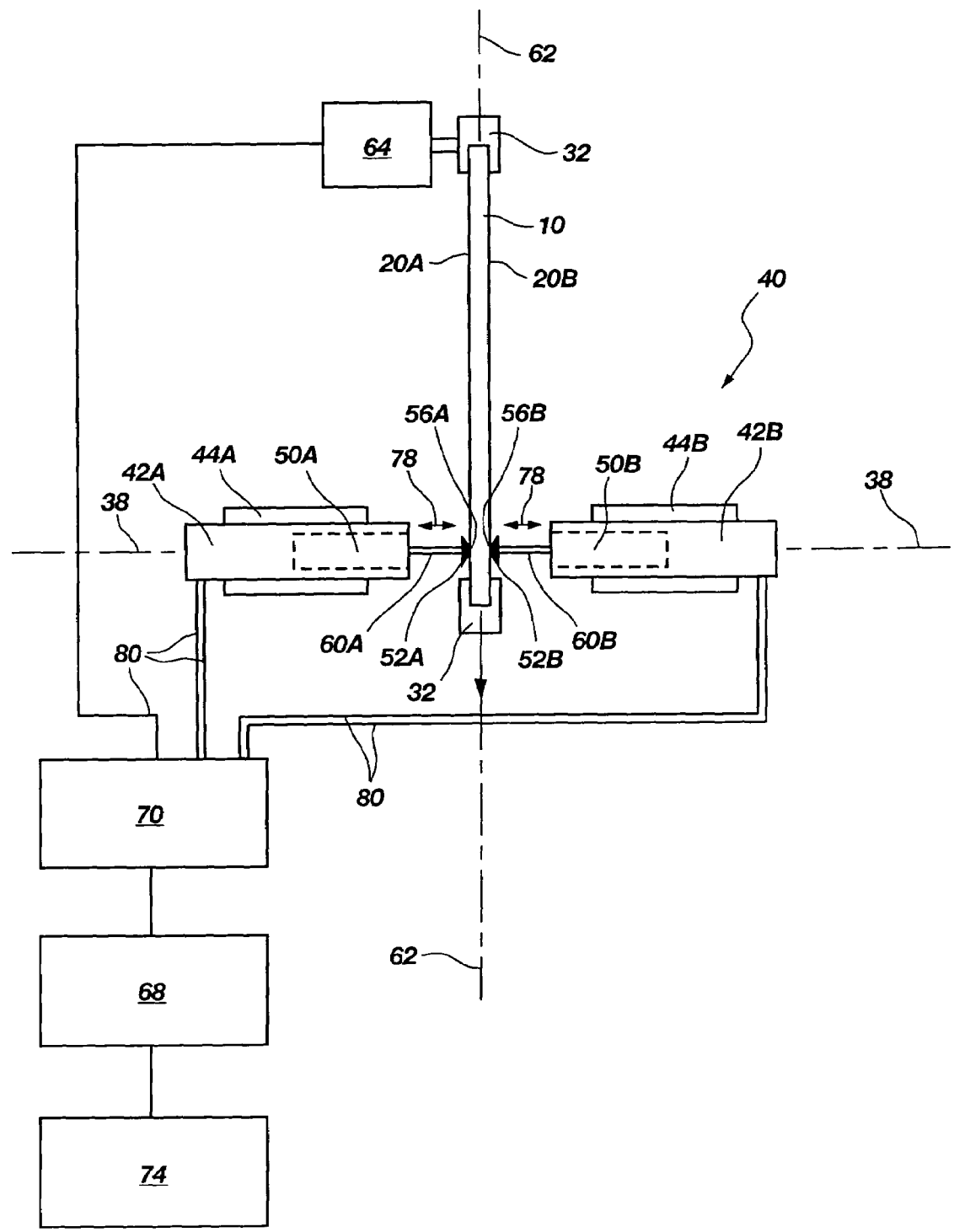
FIG. 5 is a generalized schematic view of an apparatus for measurement of substrate thickness and warpage of the invention.

In one embodiment of the invention, depicted in FIG. 5, the apparatus for determining the thickness 16 and one or more warpage displacements 26A–C (any displacement, simple or complex, being referred to herein by the numeral 26) of a pseudo-planar substrate 10 comprises a caliper gauge 40 having two yoke members 42A, 42B respectively mounted on bases 44A, 44B. Each yoke member 42A, 42B includes a linear measuring device 50A or 50B which is actuatable by an axially movable caliper finger 60A or 60B having a contact member 50A, 50B at a free, distal end thereof. Linear measuring devices 50A, 50B may comprise commercially available linear displacement measurement devices, including without limitation linear encoders, linear potentiometers, and linear displacement transducers. Linear encoders may take distance readings optically and employ either a glass scale or take distance readings magnetically and use a magnetic scale. In optical encoders, a glass scale is marked with alternating black and clear marks and the encoder outputs a sine or square wave responsive to reading the alternating black and clear marks as the encoder head moves past them. In a magnetic type encoder a magnetic scale with alternating N and S poles is employed, and the encoder outputs a sine or square wave as the encoder head moves past them. For the present application, the scales would be mounted to a solid base and the encoder heads would be mounted to the probe tips or caliper fingers 60A, 60B. The caliper fingers 60A, 60B are coaxial about a common axis 38, carry contact members 52A, 52B and are biased by springs or other resilient elements, magnetic force, etc., along axis 38 to move against opposing surfaces 20A and 20B, respectively, of substrate 10 disposed transversely therebetween, at which point their displaced linear distance positions are individually sensed by the two linear measuring devices 50A, 50B and recorded in memory 68 for computation by a calculating device in the form of computer 70. A carrier 32 holds and positions the substrate 10 at an attitude substantially normal to the contact members 52A, 52B between the yoke members 42A, 42B for making the measurements at specified corresponding locations 56A, 56B on the generally parallel surfaces 20A, 20B. The carrier 32 is movable by actuator 64 in a plane 62 normal to axis 38 so that multiple measurements may be readily performed at specific desired locations on a substrate 10 as it passes between contact members 52A, 52B in a direction perpendicular to the plane of the drawing sheet. For example, one measure of warpage may be obtained by recording measurements at as few as three locations on a substrate 10. Preferably, carrier 32 comprises a robotic gripper of an automated assembly line such as is found in the manufacture of semiconductor memory modules wherein semiconductor devices are placed on circuit boards, for example. In one embodiment, carrier 32 is configured to move substrate 10 continuously to produce a continuum or semicontinuum of measurements over the surfaces 20A, 20B. In another embodiment, carrier 32 may be configured for discontinuous movement of substrate 10, stopping at each of a plurality of predetermined measurement locations. Preferably, the carrier 32 is configured for movement of substrate 10 to permit measurements to (or very near to) the edges 22A, 22B, and/or edges 18A, 18B, so that maximum warpage displacement may be determined.

A calibration zero point 66 (see FIG. 9) against which to compare displacement of caliper fingers 60A and 60B is obtained for each finger by simply allowing the two contact members 52A, 52B to move into mutual contact under their respective axial biases without an intervening substrate 10. This method avoids the requirement of otherwise determining the exact distance between the linear measuring devices 50A and 50B. Any wear of the contact members 52A, 52B or differences in length of fingers 60A, 60B is accommodated without the need for recalibration by this calibration method. Moreover, it is not necessary for the substrate 10 to be positioned precisely equidistant from the linear measuring devices, as long as the substrate is moved parallel to plane 62, since combined and not individual displacement of contact members 52A, 52B provides the desired data. Furthermore, it is not necessary for the zero point to be in the centerline of the substrate 10 when passed between contact members 52A, 52B, inasmuch as the zero point is obtained by the addition of the two, combined contact member displacement measurements from zero point measurement, rather than the exact point of meeting. Substrate thickness measurements then taken represent actual locations on the substrate 10, in a plane which is parallel to plane 62, not necessarily in plane 62. Thus, the substrate 10 need not be positioned with its surfaces 20A, 20B precisely parallel (in the X- or Y-axis) to the plane 62 of carrier movement. The warpage results are obtained by determining any nonlinearity of the measurements on either (or both) surfaces 20A, 20B. The substrate thickness 16 is determined by summing the differences from the calibration zero point 66 for the two surfaces. Dimensional measurement data is transmitted from linear measuring devices 50A, 50B to computer 70 through electrical leads 80, computer 70 then calculating thickness and warpage, if any, for the substrate 10 measured. This data may be stored in memory 68 in association with the substrate identity (provided, for example, by scanning a bar code on the substrate 10 prior to passage between contact members 52A, 52B) and printed out, displayed on a monitor or otherwise made available on output device 74. The computer 70 may be configured with suitable hardware and software to control movement of carrier 32 through actuator 64, in addition to processing data generated from linear movement 78 of fingers 60A, 60B relative to respective linear measuring devices 50A, 50B, and calculating resulting warpage displacement 26A, 26B and/or 26C (in one or more directions) and substrate thickness 16. Furthermore, computer 70 may be configured to cause carrier 32 to direct substrates 10 exhibiting nonuniform or out-of-specification thickness, alone or in combination with out-of-specification warpage, to a rework or discard location since any unacceptable variation from acceptable tolerances programmed into computer 70 or retrievable from memory 68 are calculated substantially in real time.

The linear measuring devices 50A, 50B which may be used in the invention are commercially available in a wide variety of capacities and precision. Such devices 50A, 50B may comprise devices often designated as linear encoders. In this invention, each of the coaxial fingers 60A, 60B is biased toward the substrate 10 by, e.g., a spring having a force which is sufficiently large to achieve repetitively accurate results, yet small enough to avoid undue damage or wear on the contact members 52A, 52B or any flexure of or damage to substrate 10. Associated with each linear measuring device 50A, 50B may be a finger retractor (not shown) to retract the fingers 60A, 60B with attached contact members 52A, 52B from contact with the substrate 10.

The contact members 52A, 52B may take various forms. Each of the contact members 52A, 52B may simply be an end of a finger 60A, 60B. Four of many possible contemplated configurations enabling biased continuous-contact sliding or rolling movement across a substrate surface 20A, 20B are shown in FIGS. 6, 7, 8, and 9. In FIG. 6, the contact members 52A, 52B comprise ball-shaped nodes at the terminus of each finger 60A, 60B. In FIG. 7, the contact members are shown as having elliptical cross-sections. In FIG. 8, the contact members 52A, 52B are depicted as including rollers 76A, 76B which roll across the surfaces 20A, 20B. FIG. 9 shows the contact members as roller balls 58A, 58B which are mounted in contact members 52 to generally roll freely in all directions over a substrate surface.

Figure 10:
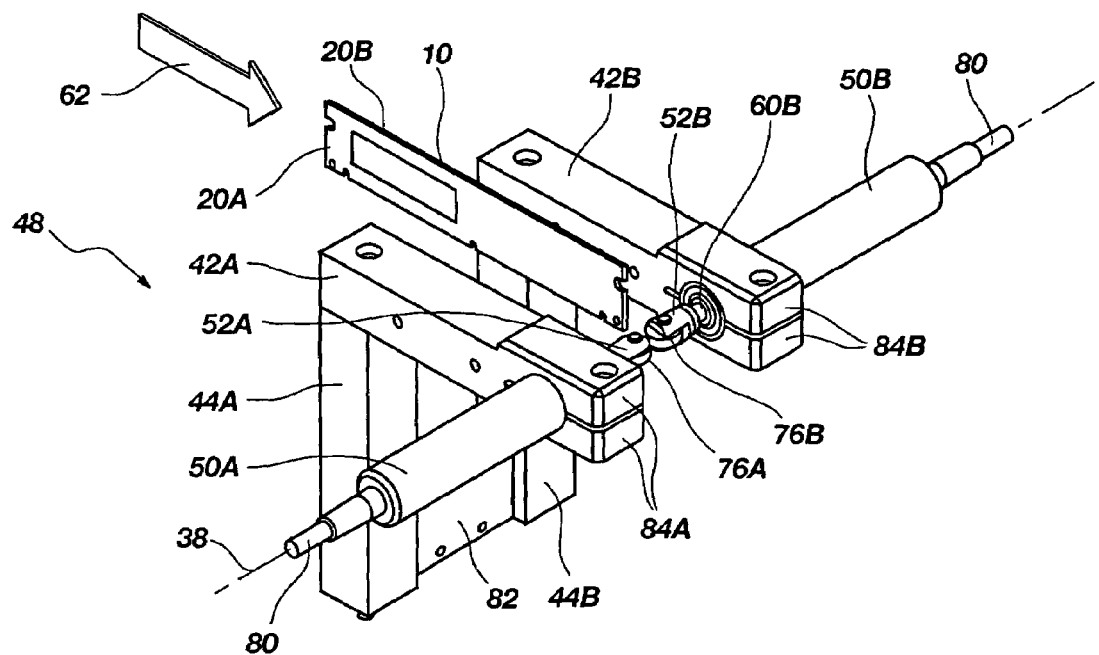
FIG. 10 is a perspective view of a specific implementation of an apparatus of the invention for measurement of substrate thickness and warpage.
Figure 11:
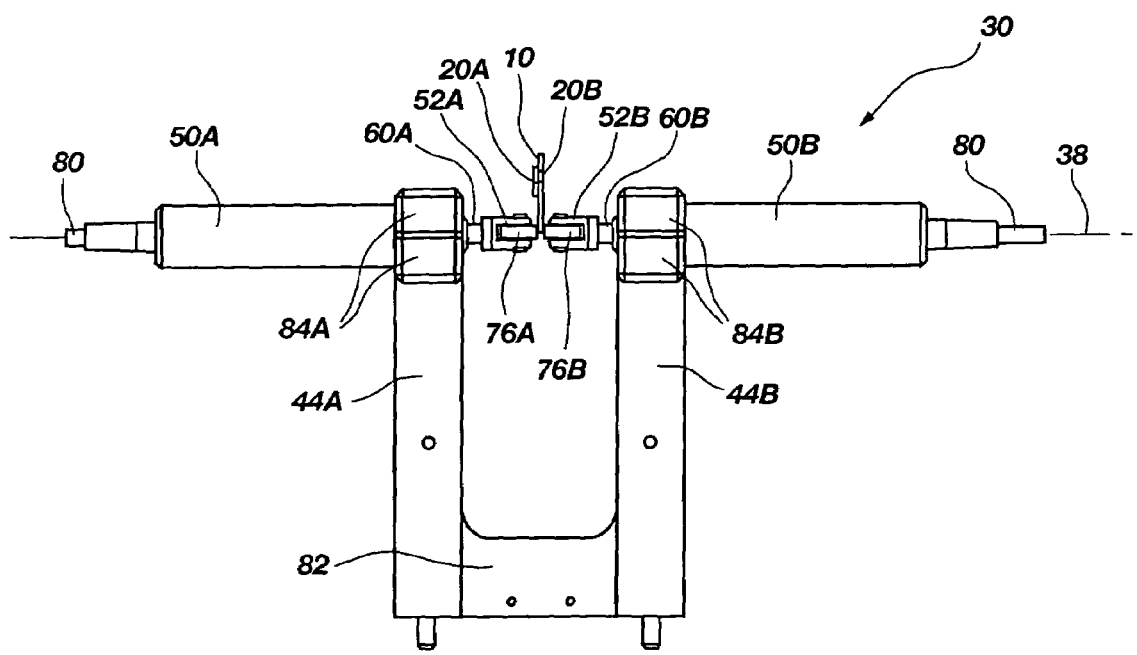
FIG. 11 is a frontal view of the specific implementation of the apparatus of FIG. 10 for measurement of substrate thickness and warpage.

Turning now to FIGS. 10 and 11, a currently preferred embodiment of a measurement yoke assembly 48 of a thickness/warpage measurement apparatus 30 of the invention is depicted. Yoke assembly 48 has first yoke member 42A and second yoke member 42B. Both yoke members 42A, 42B are mounted on bases comprising base members 44A, 44B, respectively. The base members 44A, 44B are shown as being rigidly joined by crossbar 82. Each yoke member 42A, 42B has a clamp end 84A, 84B, respectively, into which is clamped a linear measuring device 50A, 50B, respectively. A biased finger, i.e., shaft 60A, 60B, projects from each of the linear measuring devices 50A, 50B, respectively, and these fingers 60A, 60B are coaxial about axis 38. Linear measuring devices 50A, 50B may take various forms, e.g., linear encoders, and are readily available commercially. For example, one suitable measuring device is a Sony Gauge Probe, Model DG10BN. A contact member 52A, 52B is mounted on the exposed end of each finger 60A, 60B for contact with the substrate surfaces 20A, 20B, which typically are generally mirror images of each other. As shown in FIGS. 10 and 11, substrate 10 includes an exemplary semiconductor device (unnumbered) mounted thereon. In the illustrated embodiment, the contact members 52A, 52B comprise rollers 76A, 76B formed of carbide or other hard material, but as already described, other types of contact members may be used. As shown, each linear measuring device 50A, 50B has electrical leads 80 extending therefrom for communication with computer 70, memory 68 and output device 74 (FIG. 5). In FIG. 10, the rollers 76A, 76B are shown as contacting each other, i.e. at a calibration zero point 66 (see FIG. 9). The finger extension distance or position for each finger 60A, 60B at calibration zero point 66 is recorded for each contact member 52A, 52B, respectively. A substrate 10, shown as an exemplary semiconductor memory module, is shown positioned (by a carrier, not shown) ready for measurement in FIG. 10. When measurement of substrate 10 is to be undertaken, substrate 10 is passed in plane 62 between the two coaxial contact members 52A, 52B, as shown in FIG. 11. Plane 62 is generally perpendicular to axis 38 of the fingers 60A, 60B. When a desired measurement location on opposed substrate surfaces 20A, 20B is reached during travel of substrate 10 between the two contact members 52A, 52B, the respective linear positions of fingers 60A, 60B are recorded.

Figure 13:
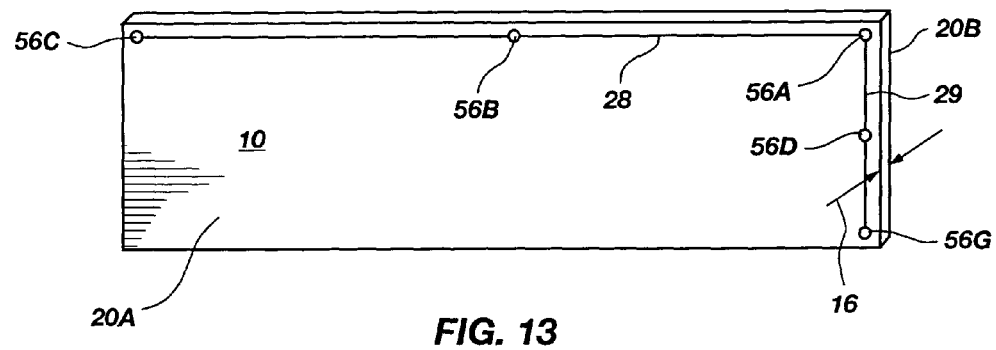
FIG. 13 is a perspective view of an exemplary substrate indicating a series of locations at which measurements may be made using the apparatus and method of the invention for determining warpage and thickness of the substrate.

The measured substrate thickness 16 is then calculated by the following equation:

$$\text{Thickness } 16 = (Da \text{ minus } D') \text{ plus } (Db \text{ minus } D'')$$

Where D' is the linear position of finger 60A at zero point 66 and Da is the linear position of finger 60A at a selected measurement location in contact with a substrate 10, D" is the linear position of finger 60B at zero point 66 and Db is the linear position of finger 60B at the measurement location in contact with substrate 10. The foregoing presumes that finger displacement, as recorded, is maximized in a direction away from zero point 66. If this is not the case, then finger displacement in contact with substrate 10 would be subtracted from finger displacement at zero point 66. In either instance, it is the difference between a zero point and a displaced location of a caliper finger 60 which provides the desired measurement data. When at least three measurements are made at points 56 in a path 28 across the substrate surface 20A, as shown in FIG. 13, the warpage displacement 26 in that direction may be determined by comparing the distances at central measurement point 56B with measurement points 56A and 56C. A displacement 26 from linearity in the measured distances indicates the degree of warpage. As an example, the measured distances (in inches) from respective calibration zero point 66 are determined for the two fingers 60A, 60B, and deviation from a straight line is determined.

| Location | Reading | − Zero Pt 66 = | Displacement Distance | |
|---|---|---|---|---|
| 56A (edge) | 2.1344 | 2.0714 | 0.0633 | (surface 20A) |
|  | 2.3200 | 2.2573 | 0.0627 | (surface 20B) |
| Thickness 16 at location 56A = 0.0633 + 0.0627 = 0.1250 | | | | |
| 56B (center) | 2.1381 | 2.0714 | 0.0667 | (surface 20A) |
|  | 2.3156 | 2.2573 | 0.0583 | (surface 20B) |
| Thickness 16 at location 56B = 0.0667 + 0.0583 = 0.1250 | | | | |
| 56C (edge) | 2.1338 | 2.0714 | 0.0632 | (surface 20A) |
|  | 2.3190 | 2.2573 | 0.0617 | (surface 20B) |
| Thickness 16 at location 56C is 0.0632 + 0.0617 = 0.1249 | | | | |

Continuing in the example, a straight line through the measured distances at locations 56A and 56C along path 28 on surface 20A yields a theoretical distance value of 2.1341. The measured value at location 56B, however, is 2.1381. The difference comprises a warpage displacement 26A of 0.0040. The warpage displacement 26A may also be calculated for the opposed surface 20B and is 0.0039. The measurements of thickness 16 at locations 56A, 56B and 56C also indicate a slight variation (0.0001) in thickness 16 of substrate 10.

While it would be possible to measure warpage by contact of a contact member 52 of a movable caliper finger 60 from just one side of a substrate 10, this may cause the substrate 10 to deform, particularly if the substrate is very thin or otherwise of marginal rigidity. However, by placing substrate 10 between two equally biased contact members 52A, 52B, for example, caliper fingers 60A, 60B will track the natural curvature, if any, of substrate 10. Further, by using two measurements from opposing sides of a substrate 10, obviously erroneous measurements may be easily detected if the linear distances measured from one side of the substrate 10 do not closely track each other within a predetermined thickness variation tolerance for the substrate 10. In other words, the curvature of warpage measured from each side of a substrate 10 should coincide but for variations in substrate thickness.

As shown in FIG. 13, warpage displacement 26 may also be determined at points 56 in a path 29 perpendicular to path 28, or warpage displacement 26 may be determined in both directions 28 and 29 in the same procedure by moving the substrate 10 in two axes. Carrier 32 may be configured, for example, to move a substrate 10 perpendicularly in plane 62 before or after moving substrate 10 horizontally between fingers 60A, 60B.

Figure 12:
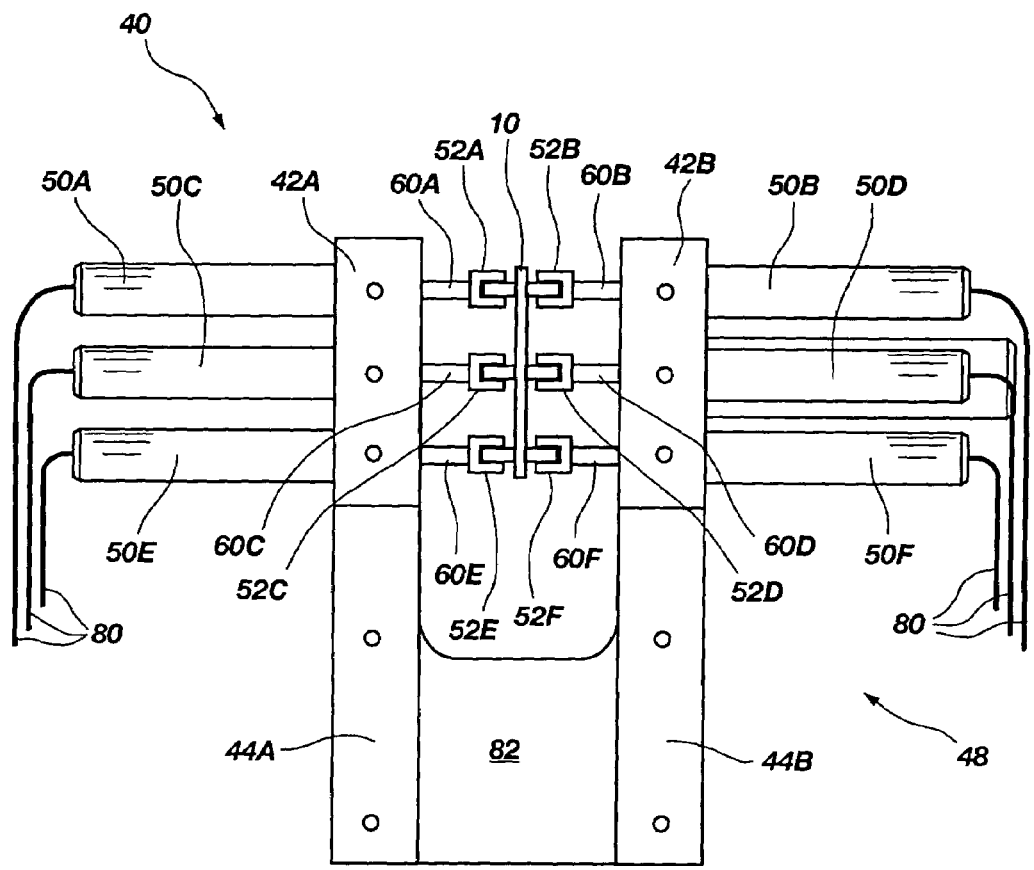
FIG. 12 is a frontal view of another embodiment of an apparatus for measurement of substrate thickness and warpage of the invention.
Figure 14:
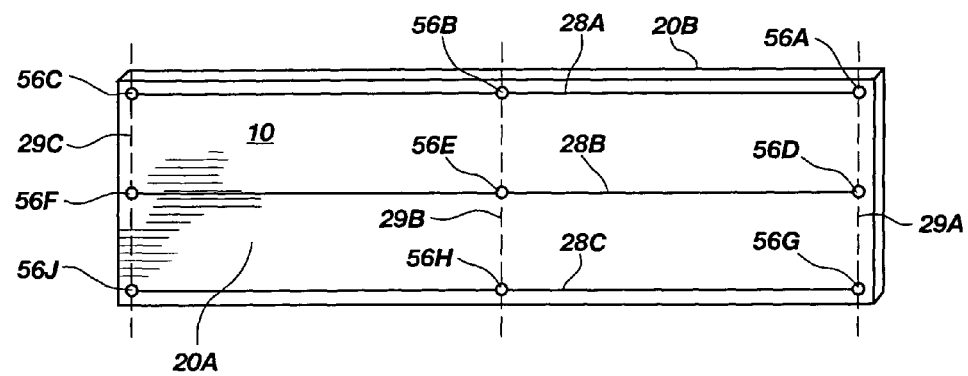
FIG. 14 is a perspective view of an exemplary substrate indicating another series of locations at which measurements are made using the apparatus and method of the invention for determining warpage and thickness of the substrate.

A variation of the apparatus 30 of FIGS. 10 and 11 is depicted in FIG. 12. In this variation, a plurality of caliper gauges 40, each with opposing contact members 52A, 52B, is mounted to a yoke assembly 48 to simultaneously determine thickness 16 at locations 56 along a plurality of paths, generally three. In this example, measurements are made at each of points 56A, 56B, 56C, 56D, 56E, 56F, 56G, 56H, and 56J along three paths 28A, 28B, 28C across a surface 20A of a substrate 10 (see FIG. 14). The opposite surface 20B will generally be characterized as a mirror image of surface 20A. As a result, warpage displacement and substrate thickness 16 may be determined in three longitudinal paths 28A, 28B and 28C, and the same determinations made along three cross-directions 29A, 29B, and 29C. Thus, the determinations are completed in a single pass, and warpage, including any complex warpage, may be readily characterized in two directions. It should be noted that linear measuring devices 50A, 50B, 50C, 50D, 50E, 5OF may be adjusted upwardly and downwardly with respect to the path of a substrate 10 to accommodate wider or narrower substrates and for placement to avoid components such as semiconductor devices mounted on a given substrate 10.

As depicted in FIG. 12, three pairs of coaxial, movable caliper fingers, i.e., 60A and 60B, 60C and 60D, and 60E and 60F have respective contact members 52A and 52B, 52C and 52D, and 52E and 52F for contacting the substrate 10. The contact members are shown as including rollers 76A, 76B as depicted in more detail in FIG. 8. Each finger 60A through 60F actuates its own linear measuring device, for example, fingers 60A and 60B actuate linear measuring devices 50A and 50B, respectively. Measurements are transmitted through leads 80 to a computer 70, memory 68 and output device 74 (see FIG. 5). Thus, complex warpage such as substrate twisting may be determined easily from the plurality of data points which may be provided both longitudinally along and laterally across a substrate 10. All of the contact members 52A, 52B . . . 52F are calibrated simultaneously to a zero point 66 when a substrate 10 is not in the caliper gauge.

In each of the above embodiments of the invention, it may be noted that while following a distance measurement, the caliper fingers 60A, 60B . . . 60N may be retracted and the substrate 10 moved to the next measurement location. Alternatively, and more preferred for speed and the capability for continuous measurement, the contact members 52A, 52B . . . 52N of fingers 60A, 60B . . . 60N are not retracted between measurements, but are displaced against their respective biases by passage of substrate 10 and simply slide or roll on the substrate surfaces 20A, 20B as substrate 10 passes therebetween. A program in computer 70 may be used to control the operations of the substrate carrier 32 and linear measuring device(s) 50. The program may include retraction of the caliper finger(s), for example, where there are interfering components such as semiconductor devices mounted on the substrate 10, where a portion(s) of the substrate is cut out, or when a substrate 10 approaches for measurement by the apparatus.

Figure 15:
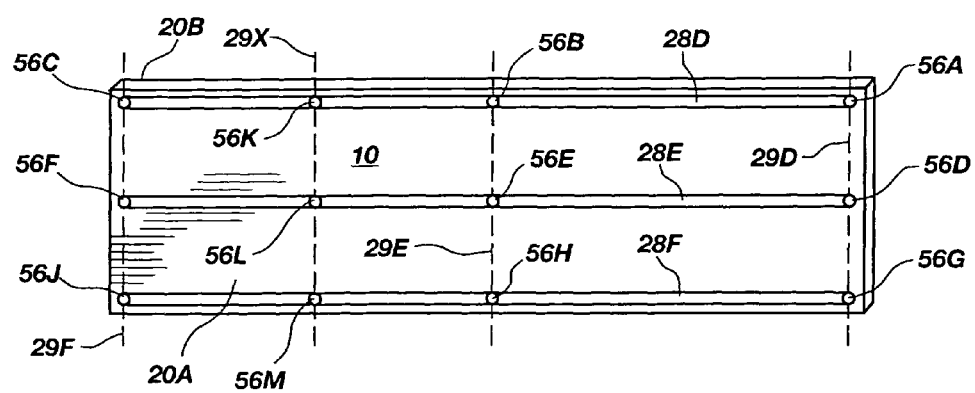
FIG. 15 is a perspective view of an exemplary substrate indicating continuous pathways over which measurements may be made using the apparatus and method of the invention for determining the warpage and thickness of the substrate.

In another embodiment as depicted in FIG. 15, measurements may be taken in a once-through continuous manner over the surfaces 20A, 20B, enabling a complete warpage/thickness analysis along every point in three parallel paths 28D, 28E, and 28F. Cross-direction warpage may be computed continuously along any portion of the paths, or may be restricted to particular desirable cross-path(s) 29X comprising measurement points 56K, 56L and 56M on the surfaces 20A, 20B, including, if desired, cross-paths 29D, 29E and 29F. If desired, a virtual representation of the substrate planarity, or lack thereof, may be generated and displayed against a baseline representing an ideal substrate, or at least one within specified planarity tolerances.

As already shown, the apparatus and method of the invention offers many advantages. First, accurate measurements of substrate thickness and warpage in more than one direction may be performed. The apparatus may be placed as part of an assembly line using automated substrate handling equipment. Zero calibration of the linear measuring devices 50 is simple, i.e., merely bringing the corresponding contact members 52 together and recording the distance or position measurements of fingers 60 within the two linear measuring devices 50. These measurements comprise the calibration zero points 66 for each linear measurement device. The apparatus of the invention may be formed from commercially available linear measuring devices 50, computer 70, memory 68 and output devices 74, such as a computer screen, printer, video, etc.

While the present invention has been disclosed herein in terms of certain exemplary embodiments, those of ordinary skill in the art will recognize and appreciate that it is not so limited. Many additions, deletions and modifications to the disclosed embodiments may be effected without departing from the scope of the invention. Moreover, features from one embodiment may be combined with features from other embodiments. The scope of the instant invention is only to be limited by the claims which follow.

What is claimed is:

1. An apparatus for determining at least one dimensional value of a substantially planar substrate, comprising:

a carrier configured for holding and positioning a substantially planar substrate in a plane, the substantially planar substrate having first and second substantially planar opposed surfaces parallel to the plane;

a first linear measuring device including a first movable caliper finger disposed on one side of the plane for measuring a first linear distance from a common zero point location to the first surface of the substrate along an axis substantially normal to the first and second surfaces, the first movable caliper finger movable in a linear direction substantially normal to the plane;

a second linear measuring device including a second movable caliper finger disposed on an opposing side of the plane for measuring a second linear distance from the common zero point location to the second surface of the substrate along the axis generally normal to the first and second surfaces, the second movable caliper finger being coaxial with the first movable caliper finger and movable in a linear direction substantially normal to the plane, the common zero point location being a location of an end of the first linear measuring device wherein the end of the first linear measuring device is in axial contact with an end of the second linear measuring device; and a calculation device for calculating the first and second linear distances.

2. The apparatus of claim 1, wherein the first and second movable caliper fingers each include terminal contact members at the ends thereof for contacting the respective first and second surfaces of the substantially planar substrate.

3. The apparatus of claim 2, wherein the first and second linear measuring devices are configured to provide a zero point value corresponding to the common zero point location in the form of a linear distance for each of the first and second movable caliper fingers for use by the calculation device in calculating the first and second linear distances.

4. The apparatus of claim 2, wherein the terminal contact members comprise one of smooth-surfaced enlargements, unidirectional rollers and multidirectional roller balls.

5. The apparatus of claim 1, wherein the first movable caliper finger and the second movable caliper finger are each biased toward the plane.

6. The apparatus of claim 1, wherein the carrier is configured to move the substantially planar substrate within the plane between the first and second movable caliper fingers.

7. The apparatus of claim 6, wherein the carrier is configured to move the substantially planar substrate in at least one linear direction parallel to the plane.

8. The apparatus of claim 7, wherein the carrier is configured to move the substantially planar substrate in a plurality of directions within the plane.

9. The apparatus of claim 8, wherein the apparatus is configured to measure the first linear distance and the second linear distance from the common zero point location in at least three different locations on the first and second surfaces of the substantially planar substrate in association with movement of the substantially planar substrate by the carrier in the plurality of directions.

10. The apparatus of claim 9, wherein the calculation device is configured to determine at least one warpage characteristic of the substantially planar substrate from some of the at least three first and second linear distance measurements.

11. The apparatus of claim 7, wherein the apparatus is configured to measure the first linear distance and the second linear distance from the common zero point location in at least three different locations on the first and second surfaces of the substantially planar substrate in association with movement of the substantially planar substrate by the carrier in the at least one direction.

12. The apparatus of claim 11, wherein the calculation device is configured to determine at least one warpage characteristic of the substantially planar substrate from at least some of the measurements at the at least three different locations.

13. The apparatus of claim 7, wherein the carrier is configured to move the substantially planar substrate continuously between the first and second movable caliper fingers while in contact therewith.

14. The apparatus of claim 13, wherein the calculation device is configured to determine at least one warpage characteristic of the substantially planar substrate from at least some of a plurality of first and second linear distance measurements taken along a line of contact with the substantially planar substrate by the first and second movable caliper fingers.

15. The apparatus of claim 1, wherein the carrier comprises a robotic gripper.

16. The apparatus of claim 1, wherein the first and second linear measuring devices comprise linear encoders, linear potentiometers or linear displacement transducers.

17. An apparatus for determining at least one dimensional value of a substantially planar substrate, comprising:

at least one complementary set of linear measuring devices including movable caliper fingers, each of the at least one set comprising:

first and second coaxial, opposing, movable caliper fingers with mutually facing terminal ends;

structure for biasing the first movable caliper finger toward the second movable caliper finger;

another structure for biasing the second movable caliper finger toward the first movable caliper finger;

a first contact member on the terminal end of the first caliper finger; and a second contact member on the terminal end of the second caliper finger;

wherein the at least one complementary set of linear measuring devices is configured to define a common zero point location at a location of mutual contact between contact members of the first and second coaxial, opposing, movable caliper fingers, to provide a corresponding zero point value as a linear distance for each movable caliper finger, and to provide displacement values for each movable caliper finger when displaced away from the common zero point location;

a carrier for holding, positioning and moving a substantially planar substrate in at least one direction parallel to a plane perpendicular to the movable caliper fingers of the at least one complementary set of linear measuring devices to pass the substantially planar substrate therebetween; and a device for receiving zero point values and displacement values and calculating at least one dimensional value associated with the substantially planar substrate.

18. The apparatus of claim 17, wherein the carrier is configured to move the substantially planar substrate parallel to the plane either continuously or discontinuously.

19. The apparatus of claim 17, wherein the device for receiving zero point values and displacement values and calculating at least one dimensional value associated with the substantially planar substrate comprises a computer and further comprises memory and at least one output device for storage and expression of the at least one dimensional value.

20. The apparatus of claim 17, wherein the carrier comprises a robotic gripper.

21. The apparatus of claim 17, wherein the contact members comprise smooth-surfaced enlargements at the terminal ends of the movable caliper fingers, unidirectional rollers or multidirectional roller balls.

22. The apparatus of claim 17, wherein the apparatus is configured to cause the linear measuring devices to provide displacement values from the zero point value in at least three different locations on the substantially planar substrate responsive to movement of the substantially planar substrate in the at least one direction.

23. The apparatus of claim 22, wherein the device for receiving zero point values and displacement values and calculating at least one dimensional value associated with the substantially planar substrate is configured to determine at least one warpage characteristic of the substantially planar substrate from at least some of the displacement values for the at least three different locations.

24. The apparatus of claim 17, wherein the carrier is configured to move the substantially planar substrate in a plurality of directions parallel to the plane.

25. The apparatus of claim 24, wherein the apparatus is configured to cause the linear measuring devices to provide displacement values from the zero point value in at least three different locations on the substantially planar substrate responsive to movement of the substantially planar substrate in the plurality of directions.

26. The apparatus of claim 25, wherein the device for receiving zero point values and displacement values and calculating at least one dimensional value associated with the substantially planar substrate is configured to determine at least one warpage characteristic of the substantially planar substrate from at least some of the displacement values for the at least three different locations.

27. The apparatus of claim 17, wherein the carrier is configured to move the substantially planar substrate continuously between the movable caliper fingers while in contact therewith.

28. The apparatus of claim 27, wherein the device for receiving zero point values and displacement values and calculating at least one dimensional value associated with the substantially planar substrate is configured to determine at least one warpage characteristic of the substantially planar substrate from at least some of a plurality of displacement values taken along a line of contact with the substantially planar substrate by the movable caliper fingers.

29. The apparatus of claim 17, wherein the linear measuring devices comprise linear encoders, linear potentiometers or linear displacement transducers.

30. The apparatus of claim 17, wherein the at least one set of complementary linear measuring devices comprises a plurality of sets of complementary linear measuring devices.

31. The apparatus of claim 30, wherein the plurality of complementary sets of linear measuring devices are mutually spaced along the plane transversely to a direction of intended movement of the substantially planar substrate by the carrier.

32. A method for determining at least one dimensional value of a substantially planar substrate, comprising:
    establishing a plane parallel to which a substantially planar substrate having a first substantially planar side and a second, opposing, substantially planar side is to be disposed;
    establishing a common zero point location in or immediately adjacent the plane from which first and second linear distances perpendicular to the plane may be measured;
    placing the substantially planar substrate parallel to the plane and with the common zero point location located within the substantially planar substrate;
    measuring the first linear distance from the common zero point location to the first substantially planar side of the substantially planar substrate in at least one location along the substantially planar substrate; and
    measuring the second linear distance from the common zero point location to the second, opposing, substantially planar side of the substantially planar substrate in the least one location along the substantially planar substrate.

33. The method of claim 32, further comprising determining a thickness of the substantially planar substrate by adding the measured first and second linear distances.

34. The method of claim 32, wherein the at least one location comprises a plurality of predetermined locations.

35. The method of claim 34, further comprising determining any warpage of the substantially planar substrate by comparing differences in at least some of the measured first and second linear distances from the zero point locations at different locations of the plurality of predetermined locations.

36. The method of claim 35, further comprising determining any warpage of the substantially planar substrate by comparing differences in measured first linear distances from the zero point location at the different locations of the plurality of predetermined locations.

37. The method of claim 34, further comprising selecting at least some of the predetermined locations of the plurality to be spaced along a longitudinal extent of the substantially planar substrate.

38. The method of claim 37, wherein the at least some predetermined locations spaced along a longitudinal extent of the substantially planar substrate are selected to be adjacent a longitudinal edge of the substantially planar substrate.

39. The method of claim 37, further comprising selecting at least one other location of the plurality of predetermined locations on the substantially planar substrate to be spaced laterally from the at least some of the predetermined locations.

40. The method of claim 34, wherein the plurality of predetermined locations comprises a substantially continuous path extending longitudinally across at least a portion of the substantially planar substrate.

41. The method of claim 32, further comprising measuring the first and second linear distances by measuring displacements of first and second opposing elements in contact with the opposing sides of the substantially planar substrate.

42. The method of claim 41, further comprising establishing the zero point location as a location of mutual contact of the first and second opposing elements without interposition of the substantially planar substrate therebetween.

43. The method of claim 42, further comprising biasing the first and second opposing elements toward mutual contact.

44. The method of claim 43, further comprising passing the substantially planar substrate between the first and second opposing elements while measuring the displacements thereof on a plurality of predetermined locations on the substantially planar substrate.

* * * * *

UNITED STATES PATENT AND TRADEMARK OFFICE
CERTIFICATE OF CORRECTION

| | | |
|---|---|---|
| PATENT NO. | : 7,131,211 B2 | Page 1 of 1 |
| APPLICATION NO. | : 10/642921 | |
| DATED | : November 7, 2006 | |
| INVENTOR(S) | : Kirstine | |

It is certified that error appears in the above-identified patent and that said Letters Patent is hereby corrected as shown below:

In column 12, line 11, in Claim 17, before "structure" insert -- a --.

In column 13, line 57, in Claim 32, delete "the least" and insert -- the at least --, therefor.

In column 14, line 23, in Claim 38, after "some" insert -- of the --.

Signed and Sealed this

Fifteenth Day of April, 2008

JON W. DUDAS
*Director of the United States Patent and Trademark Office*